United States Patent

Aratani et al.

Patent Number: 5,244,639
Date of Patent: Sep. 14, 1993

[54] METHOD AND APPARATUS FOR PREPARING HIGH-PURITY METALLIC SILICON

[75] Inventors: Fukuo Aratani; Tsuyoshi Fukutake, both of Chiba, Japan

[73] Assignee: Kawasaki Steel Corporation, Japan

[21] Appl. No.: 753,005

[22] Filed: Aug. 23, 1991

Related U.S. Application Data

[63] Continuation of Ser. No. 453,185, Dec. 15, 1989, abandoned, which is a continuation of Ser. No. 867,769, May 28, 1986, abandoned.

Foreign Application Priority Data

May 29, 1985 [JP] Japan .................. 60-117461

[51] Int. Cl.⁵ ............................................. F28D 21/00
[52] U.S. Cl. .................... 422/199; 422/198; 422/219; 422/186.22; 422/186.29; 423/348; 423/349
[58] Field of Search ............... 422/196-208, 422/186.21, 186.22, 186.23, 186.29, 219; 423/348, 349

[56] References Cited

U.S. PATENT DOCUMENTS

| Re. 25,858 | 9/1965 | Matvay | 422/186.22 |
|---|---|---|---|
| 1,402,128 | 1/1922 | Wolcott | 422/186.22 |
| 2,912,311 | 11/1959 | Mason et al. | 422/199 |
| 3,046,093 | 7/1962 | Alexander | 422/199 |
| 3,232,745 | 2/1966 | Rummel et al. | 423/349 |
| 3,423,184 | 1/1969 | Biegler et al. | 422/199 |
| 3,515,519 | 6/1970 | Sennewald | 422/186.22 |
| 3,674,668 | 7/1972 | Bjornson | 422/186.23 |
| 4,597,948 | 7/1986 | Sanjurjo | 422/199 |
| 4,684,513 | 8/1987 | Iya | 423/348 |
| 4,737,348 | 4/1988 | Levin | 422/199 |
| 4,816,228 | 3/1989 | Yoshida et al. | 422/197 |

*Primary Examiner*—Robert J. Warden
*Assistant Examiner*—Amalia Santiago
*Attorney, Agent, or Firm*—Austin R. Miller

[57] ABSTRACT

High-yield preparation of high-purity metallic silicon at is performed by subjecting a stream of oxides of silicon (e.g. in an aerosol) to reaction heat in the presence of a mixture of a material of the group including silicon carbide and silicon dioxide; and a material of the group including carbon and carbon-containing substance. Preferably, silicon oxide produced by the reaction is scavenged from exhaust gas leaving the reaction chamber, re-condensed, and returned to the reaction chamber.

11 Claims, 4 Drawing Sheets

METHOD AND APPARATUS FOR PREPARING HIGH-PURITY METALLIC SILICON

This application is a continuation of application Ser. No. 07/453,185 filed Dec. 15, 1989, now abandoned, which is a continuation of application Ser. No. 06/867,769 filed May 28, 1986, now abandoned.

BACKGROUND OF THE INVENTION

The present invention relates generally to a method and apparatus for preparing high-purity metallic silicon, such as is used in solar cells. More particularly, the invention relates to a method and apparatus for efficiently and economically preparing high-purity metallic silicon from powdered silicon dioxide.

Conventionally, metallic silicon or ferrosilicon has been prepared in arc furnaces from a mixture of silicon dioxide and carbon. In order to ensure proper ventilation and to improve the efficiency of the reduction reaction in the high temperature region of the furnace, it has been considered essential to use large grains or masses of silicon dioxide.

On the other hand, there has recently been an increasing demand for metallic silicon of high purity, especially that having a purity higher than 99.999%. Such high-purity metallic silicon has numerous applications, among which are solar cells. Refined natural silica is commonly used as the source of silicon dioxide. This refined silica is generally powdered or granular with a grain size of less than several milimeters. Therefore, in order to use this refined silica as the source silicon dioxide in the conventional apparatus, an extra process step is needed to sufficiently increase the grain size of the refined silica. This obviously leads to higher production costs and may also lower the purity of the source material.

In order to eliminate these problems in the prior art, an improved process for preparing high-purity metallic silicon has been proposed in Japanese Patent First Publication (Tokkai) Showa 57-11223. However, even the proposed improved process still requires that a part of the source silicon dioxide charge have a grain size of 3 to 12 milimeters.

Another improved process of preparing high-purity metallic silicon has been disclosed in the Japanese Patent First Publication (Tokkai) Showa 58-69713. In the disclosed process, the reaction between silica and carbon takes place in a high-temperature plasma jet which transports the resultant product onto a carbon layer. In this proposed process, a large amount of silicon carbide is created as a result of reaction with the carbon layer. The created silicon carbide tends to accumulate within the carbon layer and fill interstices between the carbon grains, which inhibits further reaction. Due to this defect, the process proposed in the Japanese Patent First Publication 58-69713 is still not useful in the manufacture of high-purity metallic silicon.

SUMMARY OF THE INVENTION

Therefore, it is an object of the present invention to provide a novel process and apparatus for preparing high-purity metallic silicon which can use fine-grained silicon dioxide without further preparatory steps for increasing grain size.

In order to accomplish the aforementioned and other objects, a process for preparing high-purity metallic silicon comprises a step of preparing a mixture of at least one of carbon and carbide and at least one of silica and silicon carbide, a step of charging the resulting mixture into an arc furnace, and directly injecting a material including silicon dioxide or silicon oxide into a high temperature region in which silica is reduced to create silicon dioxide.

Directly injecting the silicon dioxide or silicon oxide material into the high-temperature region of the furnace charged with the aforementioned mixture induces a reaction between the silicon dioxide or silicon oxide and carbon or silicon carbide to create metallic silicon.

An apparatus for implementing the aforementioned process, according to the present invention, includes a nozzle for blowing the silicon dioxide or silicon oxide. The nozzle has an end directed at the arcing region between a pair of electrodes of the arc furnace.

As is conventionally well known, the overall reaction can be expressed in the following formula (1):

$$SiO_2 + 2C \rightarrow Si + 2CO \quad (1)$$

However, in fact, during the reaction expressed in the formula (1), it is believed that the following reactions occur concurrently:

$$SiO_2 + C \rightarrow SiO + CO \quad (2)$$

$$SiO + 2C \rightarrow SiC + CO \quad (3)$$

$$SiO_2 + 3C \rightarrow SiC + 2CO \quad (4)$$

$$SiO + C \rightarrow Si + CO \quad (5)$$

$$SiC + SiO_2 \rightarrow Si + SiO + CO \quad (6)$$

$$Si + SiO_2 \rightarrow 2SiO \quad (7)$$

$$SiO + SiC \rightarrow 2Si + CO \quad (8)$$

When powdered silicon dioxide is used as a source material and charged in the furnace into which the foregoing reactions are to take place, a large amount of silicon oxide is created during heating of the material in the reaction expressed into the formula (2), since powdered materials generally have higher dissociation constants than massive materials. Since silicon oxide has a relatively high vapor pressure, it tends to escape from the furnace and so lower the yield. Furthermore, as illustrated in the formula (4), the remaining silicon dioxide reacts with carbon to form silicon carbide which tends to accumulate at the bottom of the furnace and so lower production efficiency.

In the process according to the present invention, as set forth above, a mixture of carbon and/or carbide, such as pitch, or other organic compounds, and silicon carbide and/or silica is charged into the furnace. In addition, the powdered source silica is injected in aerosol form directly into the highest temperature region of the furnace. Injecting the silica into the high temperature region promotes the reactions represented by the formulae (6), (7) or (2) and so creates silicon and gaseous silicon oxide. The gaseous silicon oxide then reacts according to the formulae (3) and (8) with the carbon or silicon carbide in the mixture, which itself produces silicon carbide according to formula (4), to form silicon and/or silicon carbide. The silicon carbide thus created again reacts with the silica or silicon oxide injected into the arcing region of the furnace according to formula (6) and (8).

As will be appreciated herefrom, the process according to the present invention can achieve a remarkably high yield in the process of preparation of high-purity metallic silicon.

Furthermore, according to the present invention, by adjusting the quantity of the silica or silicon oxide source material injected into the furnace, the amount of silicon carbide in the bottom of the furnace needed to perform the reaction can be adjusted. This, in turn, means that by adjusting the quantity of the silica or silicon oxide source material appropriately, the quantity of silicon carbide accumulating in the bottom of the furnace can be controlled. This allows continuous, long-term operation of the furnace used for preparation of high-purity metallic silicon.

When the mixture to be supplied is carbon or carbide and silicon carbide, the mixture ratio in mol is preferably equal to or greater than ½ in C/SiC. On the other hand, when the mixture is carbon or carbide and silica, the mixture mol-ratio is preferably equal to or more than 3.5 in C/SiC ratio. The aforementioned mixture ratios keep silicon losses equal to or less than 15%. Comparison with silicon losses in the conventional art will show that the yield of metallic silicon in this process is significantly improved. The yield achieved by the present invention can be further improved by collecting and re-injecting gaseous silicon oxide which would otherwise escape to the atmosphere.

In addition, by supplying the mixture of the carbon or carbide and silicon oxide or carbon or carbide and silicon carbide, heat in the furnace, i.e. sensible heat of created gas, can be effectively utilized for heating the material, to reduce required reaction heat. This makes it easier to increase or hold the temperature at the arcing region and thus makes the silicon preparation process easier. Furthermore, this reduces the amount of gas generated in the furnace and so facilitates ventilation.

In practice, the source silica and/or silicon oxide in powder state is injected into the arcing region of the furnace together with a carrier gas which should be a non-oxidizing gas, such as Ar, $H_2$, $N_2$ or the like.

In the preferred embodiment, the nozzle for injecting the silica or silicon carbide is made of carbon or silicon carbide. The injection end of the nozzle, which is subject to high temperatures, e.g. higher than 2,000° C., will tend to react with the injectant. However, after the nozzle has been reduced in length by the reaction to a given extent, the temperature at the point of injection will drop to the range of 1,700° to 1800° C., and so the nozzle will cease to react with the injectant. Therefore, no significant effect will arise from the reaction between the nozzle and other reagents in the high temperature region.

Preferably, the charge mixture is in granular form. Therefore, when the carbon or carbide and the silica making up the mixture are highly purified and thus in a fine powder state, sufficient grain size mass of those material is preferably pre-prepared by utilizing a a binder, such as sugar, phenolic plastic, starch, and the like. By enlarging the grain size, sufficient ventilation can be provided.

Furthermore, by employing external heating means, the high temperature reaction region in the furnace can be expanded. This further improves the yield of the high-purity metallic silicon. It also improves the overall efficiency of the operation. In the preferred embodiment, external heating means may perform heating by way of high-frequency induction heating The external heating means may act on the peripheral walls of the furnace or directly on the charge, i.e. the mixture of carbon and/or carbide and silica and/or silicon carbide, to heat same to a temperature equal to or higher than 1,800° C., and preferably to a temperature in excess of 2,000° C.

The gaseous silicon oxide vented with the exhaust gas of the furnace may condense as the exhaust gas cools and thus can be collected by suitable means, such as a filter bag. However, due to the relatively small grain size of the condensed silicon oxide, the filter will tend to clog very easily. In order to solve this problem, the exhaust gas is injected into the stream of source silica to be injected into the furnace to cause condensation of the silicon oxide on the periphery of the silica, or otherwise the silicon dioxide is continuously introduced into the exhaust gas passage to induce condensation of the silicon oxide, whereby the silica grains serve as nuclei of condensation of the silicon oxide. The silicon oxide condensing on the silica can be easily collected by means of a cyclone separator and re-injected into the furnace. This would be much more convenient for effectively collecting or recovering the silicon oxide than the conventional process. In this case, the top of the furnace, through which the exhaust gas vents, is preferably held at a temperature equal to or higher than 1,700° C. so as to prevent the gaseous silicon oxide from condensing thereon.

BRIEF DESCRIPTION OF THE DRAWINGS

The present invention will be understood more fully from the detailed description given herebelow and from the accompanying drawings of the preferred embodiments of the present invention, which however, should not be taken to limit the invention thereto, but are for explanation and understanding only.

In the drawings.

DESCRIPTION OF THE PREFERRED EMBODIMENT

Figure 1:
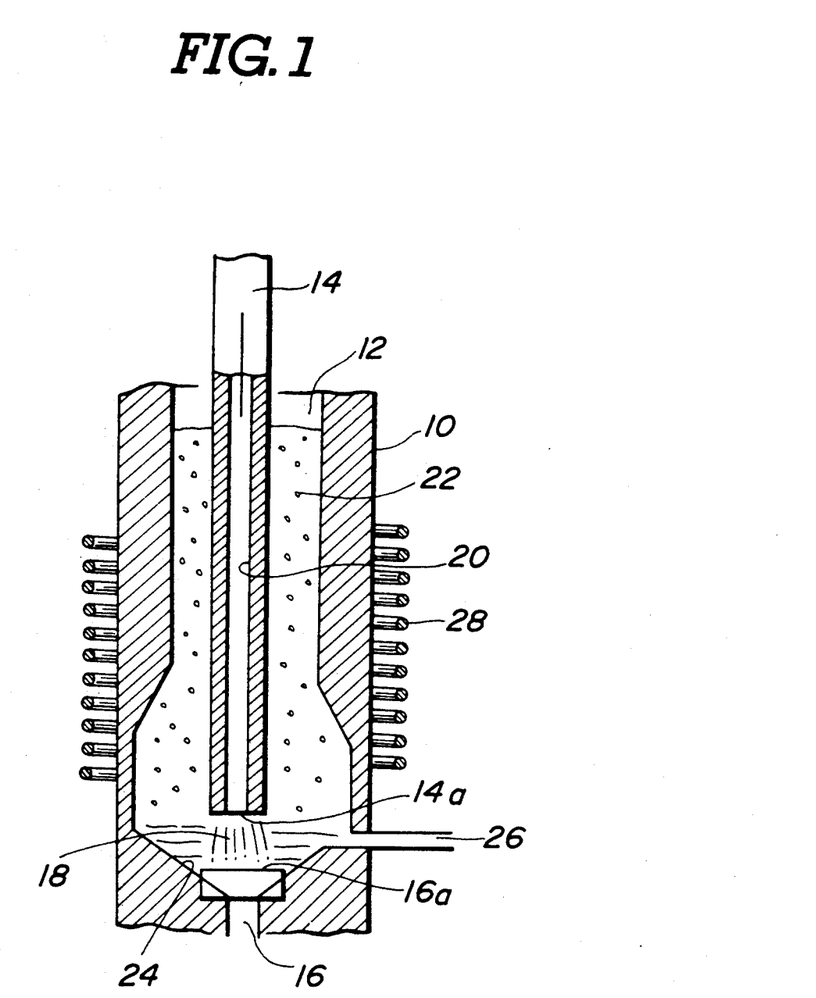
FIG. 1 is an illustration of part of the first embodiment of a high-purity metallic silicon preparation apparatus for implementing the preferred process according to the present invention.
Figure 2:
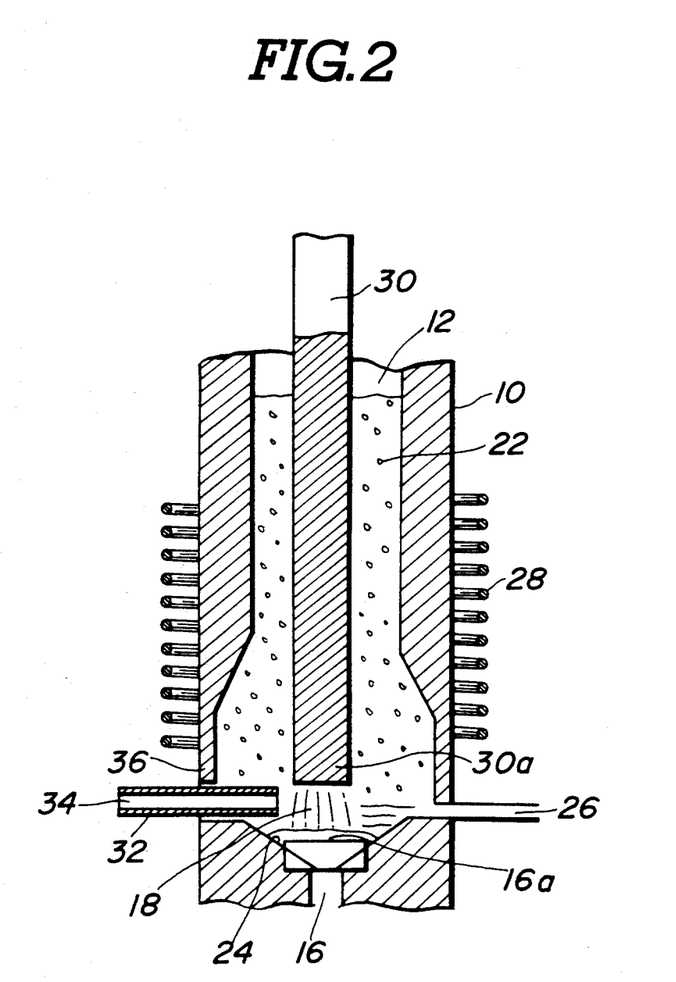
FIG. 2 is a fragmentary illustration of the second embodiment of the apparatus according to the present invention.
Figure 3:
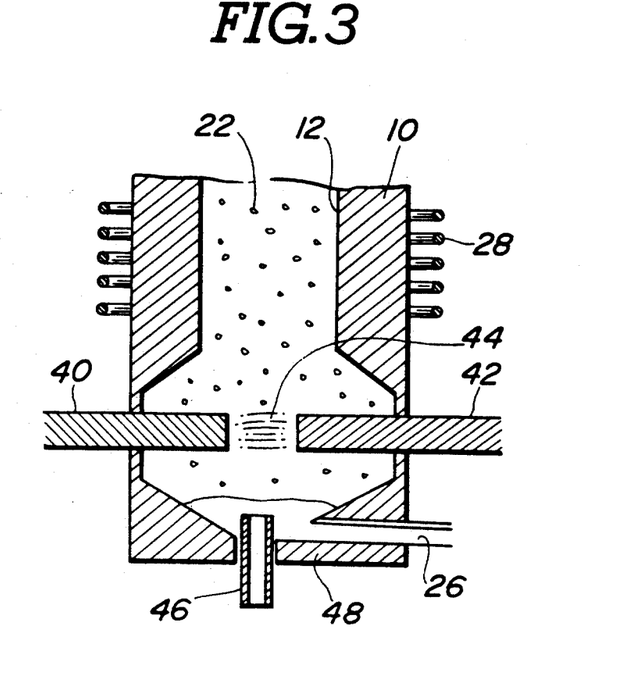
FIG. 3 is a fragmentary illustration of the third embodiment of the apparatus of the invention.
Figure 4:
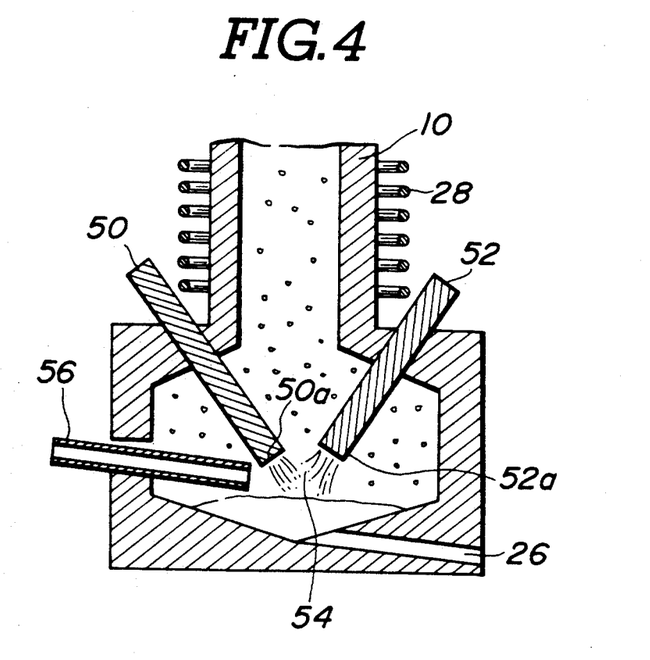
FIG. 4 is a fragmentary illustration of the fourth embodiment of the apparatus of the invention.

We refer now to the drawings, particularly to FIG. 1, which illustrates a major part of an arc furnace constituting the first embodiment of an apparatus for preparing high-purity metallic silicon and for implementing the preferred preparation process according to the present invention. A furnace body 10 is generally made of a graphitic refractory material and defines therein a reaction chamber 12. Upper and lower arc electrodes 14 and 16 are inserted within the reaction chamber 12. The upper and lower arc electrodes 14 and 16 have arcing ends 14a and 16a opposing each other across a predetermined gap 18. The gap 18 between the arcing ends 14a and 16a constitutes an arcing region.

The upper electrode 14 is in the form of a hollow cylindrical shell and thus defines a path 20 through which silicon dioxide or silicon oxide suspended in aerosol form in a carrier gas flows. The carrier gas is a non-oxidizing gas, such as Ar, $H_2$, $N_2$ and the like. The path 20 opens at the arcing region 18 to discharge the mixture of the carrier gas and the powdered silica, silicon dioxide and/or silicon oxide.

On the other hand, as a burden in the furnace, a mixture 22 of carbon and/or carbide and silica and/or silicon carbide is charged within the arcing chamber 12. The burden mixture 22 has to fill at least the lower region of the furnace including the arcing region so that the silica, silicon dioxide and/or silicon oxide will react with the carbon and/or carbide in the burden mixture 22. The metallic silicon produced by the reaction collects in the bottom 24 of the reaction chamber 12 and flows out through an outlet 26 in the floor of the furnace body 10.

A heating coil 28 is wound around the furnace body 10. The heating coil 28 is designed to perform high-frequency induction heating. In the preferred embodiment, the heating coil 28 is arranged to heat the position of the burden mixture 22 above the arcing region to a temperature equal to or greater than 1,800° C., and more preferably equal to or greater than 2,000° C.

In practice, direct-current electrical power is supplied to one of the upper and lower electrodes 14 and 16 to induce arcing across the arcing region 18. A mixture of carbon and silicon carbide in the form of pellets 8 mm to 15 mm in diameter is used as the burden mixture 22. The pellets have a silicon carbide layer on the inside and a carbon layer on the outside. Silicon dioxide suspended in $H_2$ gas serving as a carrier is injected into the arcing region 18.

Under these conditions, high-purity metallic silicon was prepared both with and without external heating of the burden by high-frequency induction heating. The general conditions of operation of the apparatus are as follows:

Molar C/SiC mixture ratio of is 1:1;
rate of injection of silicon dioxide is 5 kg/h;
rate of flow of $H_2$ is 3N $m^3$/h; and
electrical power is 100 kW/h.

The inventive reduction processes were performed in the furnace of FIG. 1. The conventional reduction process used carbon pellets and silicon dioxide pellets and in a ratio of 2/1 (in mol).

The following table I shows the results of the experimental reductions.

TABLE I

| | INVENTION (with external heating) | INVENTION (without external heating) | EXAMPLE FOR COMPARISON (conventional) |
|---|---|---|---|
| Burden Configuration | Pellet | Pellet | Pellet |
| C/SiC (molar ratio) | 1/1 | 1/1 | 2/1 |
| Pellet Supply Amount | 7kg/h | 5kg/h | 7kg/h |
| $SiO_2$ Blowing Amount | 7kg/h | 5kg/h | — |
| Carrier Gas ($H_2$) | 3Nm³/h | 3Nm³/h | — |
| Yield | 95% | 85% | 54% |

TABLE I-continued

| | INVENTION (with external heating) | INVENTION (without external heating) | EXAMPLE FOR COMPARISON (conventional) |
|---|---|---|---|
| Electricity | 19kW/kg-Si | 20kW/kg-Si | 35kW/kg-Si |

FIGS. 2 to 4 show second to fourth embodiments of the high-purity metallic silicon preparing apparatus according to the present invention. In FIGS. 2 to 4, the elements having the same construction and same function as in the apparatus of FIG. 1 will be represented by the same reference numerals, and detailed description of the common elements will be omitted in order to avoid redundancy.

In FIG. 2, an upper electrode 30 having an arcing end 30a opposes the arcing end 16a of the lower arc electrode 16. The upper arc electrode 30 is in the form of a solid bar and inserted into the reaction chamber through the top of the furnace body 10. In order to inject the source silica, silicon dioxide or silicon oxide, a graphitic supply nozzle 32 with a passage 34 for the powdered silica, silicon dioxide or silicon oxide suspended in the carrier gas extends through a vertical wall 36 of the furnace body 10 essentially horizontally so that its inner end opposes the arcing region 18 between the opposing faces of the upper and lower arc electrodes 30 and 16.

In this arrangement, the upper solid electrode 30 will be stronger than the hollow cylindrical electrode of the first embodiment of FIG. 1. Therefore, despite the high temperatures in the reaction chamber, the upper electrode 30 will be more durable for long-term use.

In FIGS. 3, a pair of arc electrodes 40 and 42 are coaxially aligned horizontally. The arc electrodes 40 and 42 oppose each other at their inner ends across a given gap 44 which serves as the arcing region. A source supply nozzle 46 extends upwards through the floor 48 of the furnace body 10.

As in the second embodiment, the life-time of the electrodes can be extended by providing a separate source supply nozzle.

In FIG. 4, a pair of electrodes 50 and 52 extend into the reaction chamber 12. The electrodes 50 and 52 lie oblique to the vertical axis of the furnace body 10. The inner ends 50a and 52a oppose to each other indirectly to define an arcing region 54. A supply nozzle 56 leads toward the arcing region and injects the silica, silicon dioxide or silicon oxide into the arcing region 54.

FIG. 5 shows the fifth embodiment of the high-purity metallic silicon preparing apparatus according to the invention. In this embodiment, the supply nozzle 60 projects into the reaction chamber 12 through the floor 10a of the furnace body 10. Two arc electrodes 62 and 64 coaxially aligned horizontally and define the arcing region 18 between their opposing inner ends. This structure is essentially as described with reference to FIG. 3.

As shown in FIG. 5, the supply nozzle 60 is connected to a reservoir 66 filled with powdered silica, silicon dioxide and/or silicon oxide. The reservoir 66 is connected to a carrier gas supply tube 68 which supplies the carrier gas, such as $H_2$. Therefore, the silica, silicon dioxide or silicon oxide is carried by the carrier gas through a supply passage 70 and injected into the arcing region 18 through the supply nozzle 60. The reservoir 66 is also connected to the top of the reaction chamber 12 in the furnace body 10 through an exhaust tube 72 which introduces exhaust gas created in the reaction chamber and containing gaseous silicon oxide.

Figure 5:
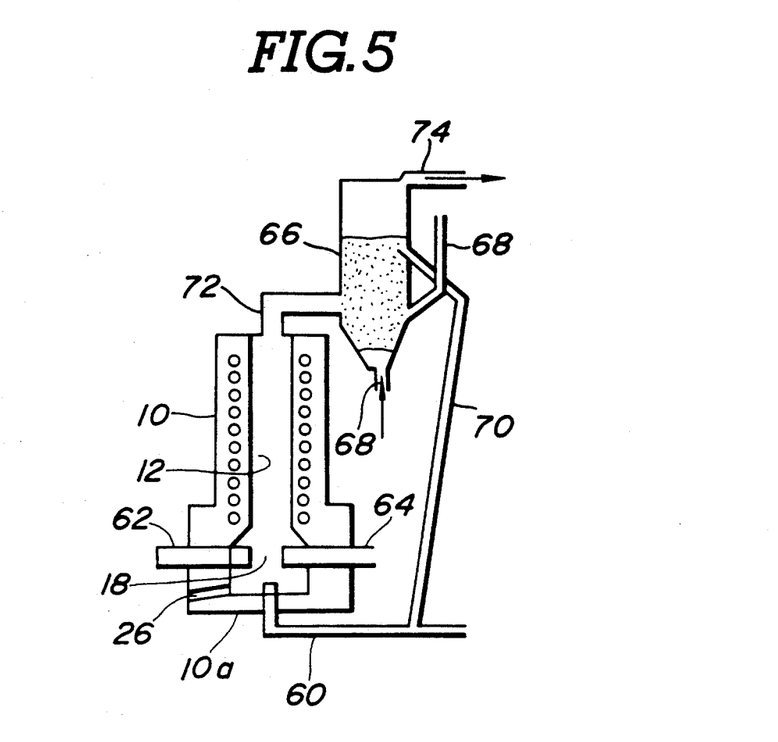
FIG. 5 is a fragmentary illustration of the overall structure of the apparatus, for which the first to fourth embodiments are applicable.

Gaseous silicon oxide is cooled within the reservoir 66 and condenses onto the silica, silicon dioxide or silicon oxide particles. Therefore, the gaseous silicon oxide can be recirculated into the arcing region together with the silica, silicon dioxide or silicon oxide. The exhaust gas minus the silicon oxide component exits the reservoir 66 through an exhaust gas outlet 74.

With this arrangement, since the gaseous silicon oxide can be effectively scavenged by recirculation through the reaction chamber 12 with the silica, silicon dioxide and/or silicon oxide, the preparation yield of the high-purity metallic silicon can be further improved.

Figure 6:
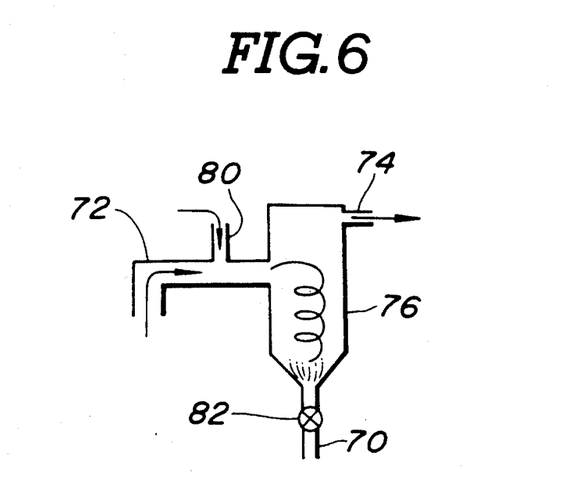
FIG. 6 is an illustration showing a major part of the apparatus as a modification of the structure in FIG. 5.

FIG. 6 shows a modification to the fifth embodiment of the apparatus. In this modification, the supply nozzle 60 (not shown in FIG. 6) is connected to a cyclone 76 through the supply passage 70. The cyclone 76 is also connected to the top of the reaction chamber through the exhaust tube 72. The exhaust tube 72 has an inlet 80 for aerosol silica, silicon dioxide and/or silicon oxide suspended in the carrier gas which mixes the latter with the exhaust gas into the cyclone.

The cyclone 76 is also provided with the exhaust gas outlet 74 through which the exhaust gas minus the gaseous silicon oxide is vented. The cyclone 76 may also be provided with a supply control valve 82 for adjusting the amount of silica, silicon dioxide and/or silicon oxide to be injected into the arcing region 18 so as to control the amount of silicon carbide created so that all of the silicon carbide can participate in the reaction and that no silicon carbide will accumulate in the bottom of the furnace.

Scavenging the gaseous silicon oxide created by the reaction in the furnace and recirculating same into the arcing region together with the silica, silicon dioxide and/or silicon oxide source, the yield can be further improved to approximately 99%.

Therefore, the present invention fulfills all of the object and advantages sought therefor.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principles of the invention set out in the appended claims.

What is claimed is:

1. An apparatus for preparing high-purity metallic silicon from a first material selected from the group consisting of carbon and carbon-containing substances; a second material selected from the group consisting of silicon carbide and silicon dioxide and a third material selected from the group consisting of silicon dioxide and silicon oxide, comprising:
   a furnace body defining therein a reaction chamber with charging means for receiving a mixture of a first and second material in the form of pellets which reaction chamber is composed of;
   (i) a reaction chamber lower portion which is located in a lower portion of said reaction chamber and which comprises
      (a) a pair of arc electrodes having an arcing region of known dimensions, which arcing region is formed between the ends of said electrodes, said electrodes being positioned opposing each other, said arcing region being heated to a temperature equal to or higher than about 1,700° C. by arcing to serve as a first heated region,
      (b) means for directly injecting a stream of a third material into said arcing region so as to induce gaseous silicon oxide (SiO) generating reactions between said third material and said first or second material, and
      (c) an outlet for molten metallic silicon which is located in a floor of said furnace body and connected to the outside of said furnace body; and
   (ii) a reaction chamber upper portion
      (a) which is located in an upper portion of said furnace body and is internally connected to said reaction chamber lower portion,
      (b) which reaction chamber upper portion has a heating means external of said reaction chamber upper portion and connected for heating a part of said upper portion together with said mixture to a temperature equal to or higher than about 1,800° C., which part serves as a second heated region, so as to induce solid silicon carbide (SiC) generation reactions between said first material and said second material or said gaseous silicon oxide, which has been generated at said arcing region and transported to said upper portion, and so as to induce molten metallic silicon (Si) generation reactions mainly between said gaseous silicon oxide generated in said lower portion and said solid silicon carbide generated in said upper portion, and
      (c) which reaction chamber upper portion further has an outlet for gases, which outlet is located at the top of said reaction chamber.

2. An apparatus as set forth in claim 1 wherein said external heating means performs high-frequency induction heating.

3. An apparatus for preparing high-purity metallic silicon from a first material selected from the group consisting of carbon and carbon-containing substances, a second material selected from the group consisting of silicon carbide and silicon dioxide and a third material selected from the group consisting of silicon dioxide and silicon oxide, comprising:
   a furnace body defining therein a reaction chamber with charging means for receiving a mixture of a first and second material in the form of pellets which reaction chamber is composed of
   (i) a lower reaction chamber portion which is located in a lower portion of said reaction chamber and which comprises
      (a) a pair of opposed arc electrodes having an arcing region of known dimensions which arcing region is formed between the ends of said electrodes and is heated to a temperature equal to or higher than about 1,700° C. by arcing to serve as a first heated region,
      (b) means for directly injecting a stream of a third material into said arcing region so as to induce gaseous silicon oxide (SiO) generating reactions between said third material and said first or second material, and
      (c) an outlet for molten metallic silicon which is located in a floor of said furnace body and connected to the outside of said furnace body; and
   (ii) a reaction chamber upper portion (a) which is located in an upper portion of said reaction chamber and is internally connected to said lower portion (b) which reaction chamber upper portion has an external heating means for heating apart of said upper portion together with said mixture to a temperature equal to or higher than about 1,800° C., which part serves as a second heated region, so as to induce solid silicon carbide (SiC) generation reactions between said first material and said second material or said gaseous silicon oxide, which has been generated at said arcing region and transported to said upper portion, and so as to induce molten metallic silicon (Si) generation reactions mainly between said gaseous silicon oxide generated in said lower portion and said solid silicon carbide generated in said upper portion, and (c) which reaction chamber upper portion has an outlet for gases, which outlet is located at the top of said reaction chamber; and means for collecting said gaseous silicon oxide generated in said reaction chamber and exhausted through said outlet for gases and for re-injecting the same into said arcing region.

4. An apparatus as set forth in claim 3 wherein said gaseous silicon oxide collecting and re-injecting means induces said gaseous silicon oxide to condense prior to reinjection into said arcing region.

5. An apparatus as set forth in claim 4 wherein said gaseous silicon oxide collecting and re-injecting means is disposed within a material supply passage of said third material injecting means and induces said gaseous silicon oxide to condense onto particles in said stream of said third material prior to reinjection into said arcing region.

6. An apparatus as set forth in claim 1 wherein said third material injecting means comprises an injection nozzle inserted into said reaction chamber and having an inner end directed toward said arcing region.

7. An apparatus as set forth in claim 6 wherein said injection nozzle extends horizontally through a side wall of said furnace body.

8. An apparatus as set forth in claim 1 wherein said pair of arc electrodes are arranged in vertical alignment.

9. An apparatus as set forth in claim 1 wherein said pair of arc electrodes lie oblique to the horizontal plane and to each other.

10. An apparatus as set forth in claim 6 wherein said injection nozzle extends vertically through a floor of said furnace body.

11. An apparatus as set forth in claim 1 wherein said pair of ar electrodes are arranged in horizontal alignment.

* * * * *

UNITED STATES PATENT AND TRADEMARK OFFICE
CERTIFICATE OF CORRECTION

PATENT NO.  : 5,244,639
DATED       : September 14, 1993
INVENTOR(S) : Fukuo Aratani, et al It is certified that error appears in the above-indentified patent and that said Letters Patent is hereby corrected as shown below:

In Column 1, Line 41, delete "57-11223" and substitute --57-111223--.

In Column 2, Line 40, delete "in" and substitute --into--.

In Column 5, Line 44, delete "of".

In Column 9, Line 5, delete "apart" and substitute --a part--.

Signed and Sealed this

Tenth Day of May, 1994

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO : 5,244,639

DATED : September 14, 1993

INVENTOR(S) : Fukuo Aratani, et. al.

It is certified that error appears in the above-identified patent and that said Letters Patent is hereby corrected as shown below:

Column 4, line 16, delete "silicon dioxide" and subsitute --silica--.

Signed and Sealed this

Seventh Day of March, 1995

Attest:

*Attesting Officer*

BRUCE LEHMAN

*Commissioner of Patents and Trademarks*